(12) United States Patent
Hemmingsen et al.

(10) Patent No.: US 11,035,755 B2
(45) Date of Patent: Jun. 15, 2021

(54) IN-CYLINDER PRESSURE SENSOR SYSTEM AND PRESSURE SENSOR ADAPTOR

(71) Applicant: Caterpillar Inc., Peoria, IL (US)

(72) Inventors: Bradley D. Hemmingsen, Washington, IL (US); Justin D. Bushman, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/589,425

(22) Filed: Oct. 1, 2019

(65) Prior Publication Data

US 2021/0096041 A1  Apr. 1, 2021

(51) Int. Cl.
| | | |
|---|---|---|
| *G01M 15/08* | (2006.01) | |
| *F02B 77/08* | (2006.01) | |
| *F02D 41/04* | (2006.01) | |

(52) U.S. Cl.
CPC ........... *G01M 15/08* (2013.01); *F02B 77/085* (2013.01); *F02D 41/042* (2013.01); *F02D 2200/024* (2013.01)

(58) Field of Classification Search
CPC .... G01M 15/08; F02B 77/085; F02D 41/042; F02D 2200/024
See application file for complete search history.

(56) References Cited

U.S. PATENT DOCUMENTS

| | | | | |
|---|---|---|---|---|
| 5,900,541 A * | 5/1999 | Morris | .................. | G01L 5/0004 |
| | | | | 73/114.16 |
| 7,111,505 B2 * | 9/2006 | Kestly | ................... | F02F 11/002 |
| | | | | 73/114.18 |
| 8,371,156 B2 * | 2/2013 | Toth | ...................... | G01M 15/08 |
| | | | | 73/114.18 |
| 8,374,772 B2 | 2/2013 | Taibi et al. | | |
| 8,555,843 B2 | 10/2013 | Klousia et al. | | |
| 9,835,523 B2 * | 12/2017 | Misaizu | .................. | G01L 23/10 |
| 2011/0239749 A1 * | 10/2011 | Toth | ........................ | G01L 23/08 |
| | | | | 73/114.18 |
| 2013/0042674 A1 * | 2/2013 | Toth | ...................... | F16J 15/064 |
| | | | | 73/114.18 |
| 2015/0247460 A1 * | 9/2015 | Sauerhoefer | ............ | F01D 25/18 |
| | | | | 60/39.08 |
| 2017/0254262 A1 * | 9/2017 | Sasaki | ................... | F02B 77/085 |

FOREIGN PATENT DOCUMENTS

| | | |
|---|---|---|
| CN | 101266195 A | 9/2008 |
| CN | 202074088 U | 12/2011 |
| CN | 202165663 U | 3/2012 |

* cited by examiner

*Primary Examiner* — Xiao En Mo
(74) *Attorney, Agent, or Firm* — Hibshman Claim Construction PLLC

(57) ABSTRACT

An in-cylinder pressure sensor system and a pressure sensor adaptor that allows for the inclusion of a pressure sensor to monitor the pressure of an engine cylinder is provided. The pressure sensor adaptor includes a first end, a second end, a threaded section, a cylindrical midsection, and an annular section; and a pressure sensor channel that comprises an opening in the first end and an opening in a second end and spans from the first end to the second end through the threaded section, the cylindrical midsection, and the annular section. The pressure sensor may be housed in the pressure sensor channel of the pressure sensor adaptor.

20 Claims, 4 Drawing Sheets

IN-CYLINDER PRESSURE SENSOR SYSTEM AND PRESSURE SENSOR ADAPTOR

TECHNICAL FIELD

The present disclosure relates to an in-cylinder pressure sensor system and an adaptor that allows for the inclusion of a pressure sensor to monitor the pressure of an engine cylinder.

BACKGROUND

The determination of the pressure within one or more cylinders of an engine may provide valuable data that may be used in engine development, monitoring, and diagnostics. The pressure data may be used, for example, in engine performance and/or diagnostic strategies to determine engine working conditions, control engine parameters, optimize engine working conditions, and monitoring engine health.

Obtaining real-time pressure data of a cylinder during regular performance of an engine is often problematic. Generally, the engine must be modified so that a pressure sensor may access the combustion chamber to obtain data. For example, to obtain access to a combustion chamber of a cylinder may require the machining of special cylinder heads to include a separate channel that allows for the inclusion of a pressure sensor. This may result in down time of the engine while parts are machined and is not practical in certain applications.

For example, U.S. Pat. No. 9,835,523 provides a combustion pressure detection device for detecting combustion pressure inside a combustion chamber of an internal combustion engine. The combustion pressure detection device requires a cylinder head that is configured so that combustion pressure detection device is attachable to the cylinder head via a hole in the cylinder head that provides linear access to the combustion chamber. Stated differently, a straight line may be drawn through the longitudinal axis of the pressure detection device directly into the combustion chamber.

SUMMARY OF THE DISCLOSURE

In one aspect of the present disclosure, an internal combustion engine including a combustion chamber defined by the space between a cylinder in an engine block, a cylinder head, and a piston; a cylinder head channel in the cylinder head; a non-linear access channel that connects the cylinder head channel to the combustion chamber; a pressure sensor adaptor housed in the cylinder head channel, the pressure sensor adaptor including: a first end, a second end, a threaded section, a cylindrical midsection, and a annular section; and a pressure sensor channel that includes an opening in the first end and an opening in a second end and spans from the first end to the second end through the threaded section, the cylindrical midsection, and the annular section; and a pressure sensor housed in the pressure sensor channel of the pressure sensor adaptor.

In another aspect of the present disclosure, a kit including a pressure sensor adaptor including a first end, a second end, a threaded section, a cylindrical midsection, and a annular section; and a pressure sensor channel that includes an opening in the first end and an opening in a second end and spans from the first end to the second end through the threaded section, the cylindrical midsection, and the annular section; and a pressure sensor.

In another aspect of the present disclosure, a method of installing a pressure sensor including providing an internal combustion engine that includes a combustion chamber defined by the space between a cylinder in an engine block, a cylinder head and a piston, and a cylinder head channel in the cylinder head that provides access to the combustion chamber; installing a pressure sensor adaptor in the cylinder head channel, the pressure sensor adaptor including a first end, a second end, a threaded section, a cylindrical midsection, and an annular section; and a pressure sensor channel that includes an opening in the first end and an opening in a second end and spans from the first end to the second end through threaded section, the cylindrical midsection, and the annular section; and installing a pressure sensor in the pressure sensor channel.

Other features and aspects of this disclosure will be apparent from the following description and the accompanying drawings.

BRIEF DESCRIPTION OF THE DRAWINGS

Further features and advantages of the invention will become apparent from the description of embodiments using the accompanying drawings. In the drawings.

DETAILED DESCRIPTION

Figure 1:
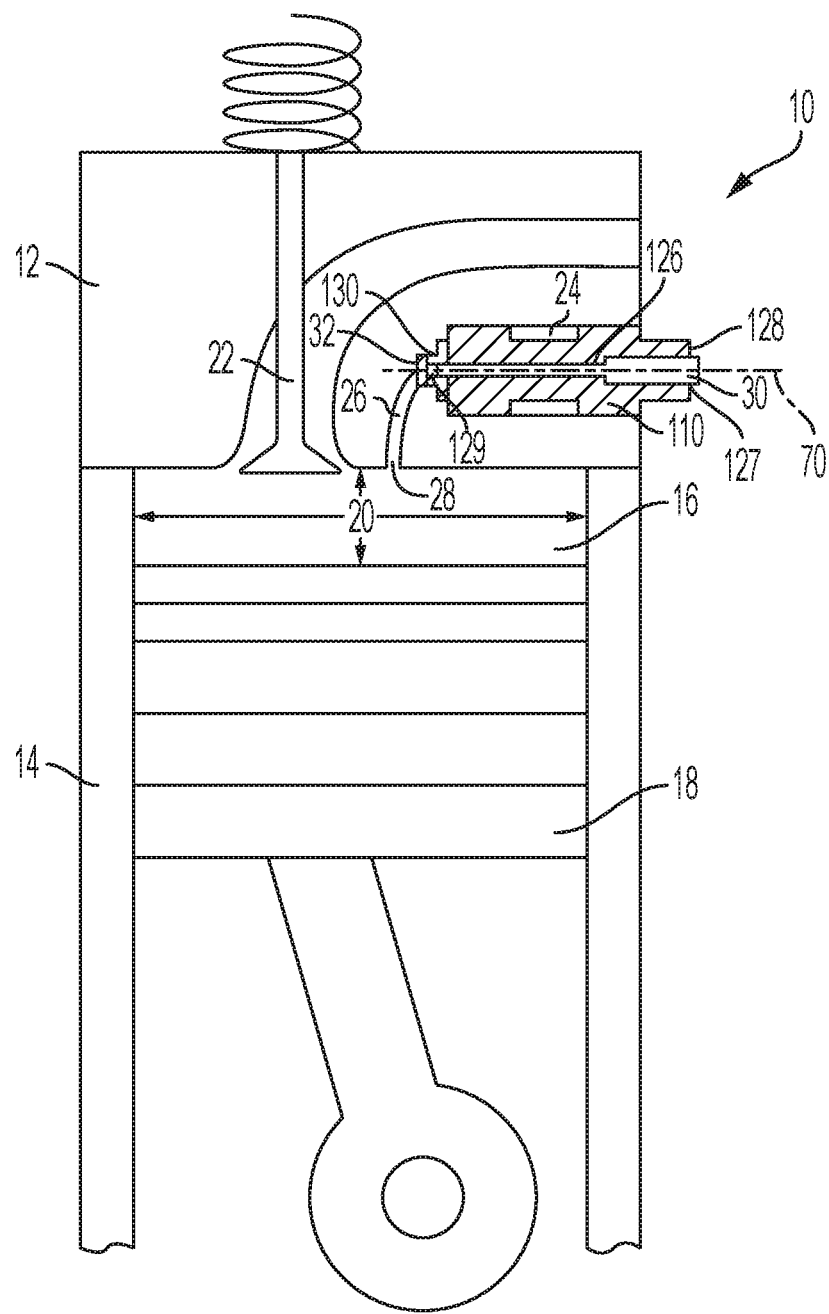
FIG. 1 is a cross section view of an embodiment of an exemplary internal combustion engine that includes a pressure sensor adaptor housing a pressure sensor.

Referring to the drawings, FIG. 1 is a perspective view of an exemplary embodiment of an internal combustion engine 10. The internal combustion engine 10 includes a cylinder head 12 attached to an engine block 14. The engine block 14 includes a chamber that forms a cylinder 16. The cylinder 16 may optionally be lined with a cylinder liner (not shown). The cylinder 16 houses a piston 18 that during operation of the engine moves within the cylinder in a reciprocating fashion. The area defined by the cylinder 16, the cylinder head 12, and the piston 18 forms a combustion chamber 20. In the combustion chamber 20, a mixture of air and fuel is burned providing the power to drive the piston 18 away from the cylinder head 12. The cylinder head 12 includes at least one valve 22 that allows for one or more functions selected from intake of air into the combustion chamber 20, intake of fuel into the combustion chamber 20, and expulsion of exhaust gases from the combustion chamber 20. Suitable types of internal combustion engines include spark ignition engines or compression ignition engines (e.g., a diesel fuel engine or a dual fuel engine). The internal combustion engine 10 may include any number of cylinders. In one or more embodiments, each of the cylinders 16 of the internal combustion engine 10 may have a single individual cylinder head 12. In other embodiments, 2 or more cylinders may be attached to a cylinder head 12.

The internal combustion engine 10 includes a cylinder head channel 24, for example in cylinder head 12, that allows for the installation of a pressure sensor adaptor 110. The pressure sensor adaptor 110 includes a first end 128 having a flat face and an opposing second end 130 having a flat face. A pressure sensor channel 126 spans the length of the pressure sensor adaptor 110 from the first end 128 to the second end 130. The pressure sensor channel 126 includes a first opening 127 in the flat face of the first end 128 and a second opening 129 in the flat face of the second end 130. Housed in the pressure sensor channel 126 is a pressure sensor 30. A longitudinal axis 70 of the pressure sensor 30 is shown as a dotted line running through the center of the pressure sensor 30 and extending to both directions away from the pressure sensor 30. Suitable examples of pressure sensors 30 include, but are not limited to, piezoelectric type pressure sensors, strain gauge type pressure sensors, electromagnetic type pressure sensors, and optical type pressure sensors. Specific examples of piezoelectric type pressure sensors include, but are not limited to, silicon-type piezoelectric pressure sensors. As used herein, when the pressure sensor 30 is housed within the pressure sensor channel 126 of the pressure sensor adaptor 110, the combination of the pressure sensor adaptor 110 and the pressure sensor 30 may be referred to as the pressure sensor assembly.

Optionally, situated in cylinder head channel 24 and abutting the flat face of the second end 130 is annulus-shaped seal 32. The annulus-shaped seal 32 may be made of any suitable material that helps to provide a seal when the pressure sensor assembly is installed in the pressure sensor channel 126. Suitable materials for the annulus-shaped seal 32 include crushable metals that may be crushed during the installation of the pressure sensor adaptor 110 to create a sealing surface.

The pressure sensor adaptor 110 is situated within the cylinder head channel 24 so that the pressure sensor 30 has access to the combustion chamber 20. The pressure sensor 30 may access the combustion chamber 20 directly or through an access channel 26 that connects the cylinder head channel 24 to the combustion chamber 20. The access channel 26 may connect with the combustion chamber 20 at access channel opening 28. In certain embodiments, the access channel 26 is non-linear. In these or other embodiments, the access channel 26 may be curved or bent at an angle. In certain embodiments, where the access channel 26 is non-linear, the longitudinal axis 70 of the pressure sensor 30 does not run through the combustion chamber 20. In certain embodiments, where the access channel 26 is non-linear, the longitudinal axis 70 of the pressure sensor 30 does not run through the access channel opening 28.

The number of pressure sensor assemblies in the internal combustion engine 10 may vary based upon design and specific needs. In one or more embodiments, each of the combustion chambers 20 of the internal combustion engine 10 may have a single pressure sensor assembly. In one or more embodiments, a quarter of the combustion chambers 20 may include a single pressure sensor assembly, in other embodiments a third of the combustion chambers 20 may include a single pressure sensor assembly, and in other embodiments half of the combustion chambers 20 may include a single pressure sensor assembly. In other embodiments, only one of the combustion chambers 20 of the internal combustion engine 10 includes a pressure sensor assembly.

Figure 2:
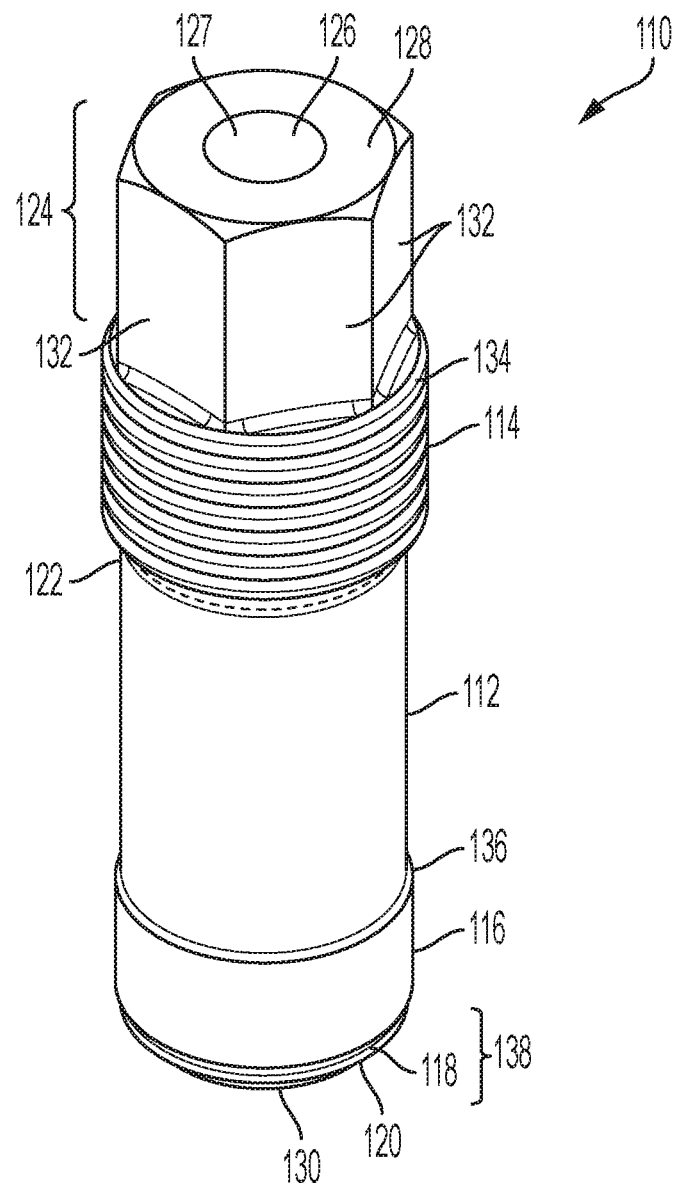
FIG. 2 is a perspective view of an exemplary embodiment of a pressure sensor adaptor.

FIG. 2 is a perspective view of an exemplary embodiment of a pressure sensor adaptor 110. In the illustrated embodiment, the pressure sensor adaptor 110 includes a tool interface 124. In certain embodiments, the tool interface 124 may be a hexagonal head that include a series of 6 faces 132. The tool interface 124 meets a threaded section 114 at a threaded section lip 134. The threaded section 114 ends at a tapered section 122. The tapered section 122 transitions from the threaded section 114 into a cylindrical midsection 112. The cylindrical midsection 112 meets an annular section 116 at an annular section lip 136. Adjacent to the annular section 116 is a tiered section 138.

Figure 3:
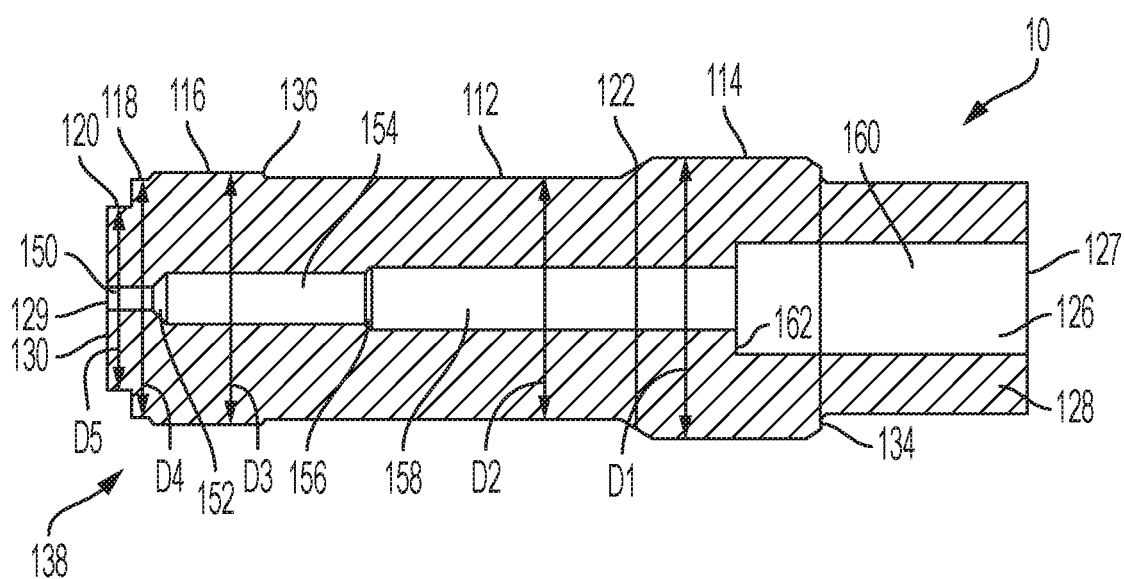
FIG. 3 is a cross section view of the pressure sensor adaptor of FIG. 2.

FIG. 3 is a cross section view of the pressure sensor adaptor of FIG. 2. As noted above, the pressure sensor adaptor 110 includes a pressure sensor channel 126 that spans the length of the pressure sensor adaptor 110 from the first end 128 to the second end 130. The pressure sensor channel 126 may include a series of cylindrical sections or conical sections that decrease in diameter when traversing from the first end 128 to the second end 130. The pressure sensor channel 126 may include a first cylindrical section 150 that includes an opening at the second end 130. At one end of the first cylindrical section 150, opposite the second end 130, is a first truncated cone section 152. The first truncated cone section 152 transitions from the first cylindrical section 150 to a second cylindrical section 154. The second cylindrical section 154 is flanked on a first end by the first truncated cone section 152 and on a second end by a second truncated cone section 156. The second truncated cone section 156 transitions from the second cylindrical section 154 to a third cylindrical section 158. The third cylindrical section 158 opens into a fourth cylindrical section 160. The fourth cylindrical section 160 has a lip section 162 and an opening at the first end 128.

The threaded section 114 has an outer diameter D1 that is greater than or equal to the diameter of the tool interface 124. In certain embodiments, the outer diameter D1 may be from about 44.4 mm to about 44.6 mm. The cylindrical midsection 112 has an outer diameter D2 that is less than the outer diameter D1 of the threaded section 114. In certain embodiments, the outer diameter D2 may be from about 38.5 mm to about 39.5 mm. The annular section 116 has an outer diameter D3 that is greater than the outer diameter D2 of the cylindrical midsection 112. In certain embodiments, the outer diameter D3 may be from about 40.75 mm to about 40.85 mm. The tiered section 138 includes a first tier 118 that has an outer diameter D4 that is less than the outer diameter D3 of the annular section 116 and a second tier 120 that has an outer diameter D5 that is less than the outer diameter D4 of the first tier 118. In certain embodiments, the outer diameter D4 may be from about 38.0 mm to about 39.0 mm. In certain embodiments, the outer diameter D5 may be from about 29.77 mm to about 30.03 mm.

Figure 4:
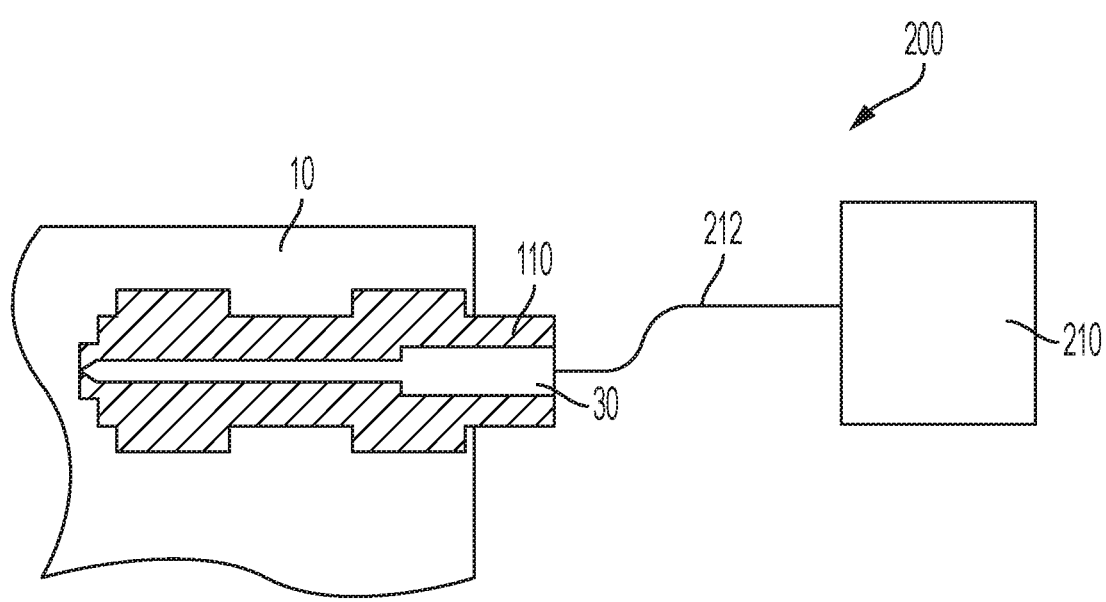
FIG. 4 is schematic of an exemplary embodiment of a pressure sensor measuring system.

FIG. 4 is a schematic of an exemplary embodiment of a pressure sensor measuring system 200. The pressure sensor measuring system 200 includes the internal combustion engine 10 that allows for the installation of the pressure sensor adaptor 110. Housed in the pressure sensor adaptor 110 is the pressure sensor 30. The pressure sensor 30 is connected to a controller 210. The pressure sensor 30 may provide information on the pressure within the combustion chamber of the internal combustion engine 10 to the controller 210. The information may be sent from the pressure sensor 30 to the controller 210 via a cable 212. Cable 212 is configured to allow the transmission of a signal made by the pressure sensor 30 to the controller 210. While shown connected to a controller 210 in the pressure sensor measuring system 200 of FIG. 4, the pressure sensor 30 may alternatively be connected to a pressure sensor readout (not shown) for displaying pressure information.

The controller 210 may include a computer, which has all components required to run an application, such as, for example, a memory, a secondary storage device, a processor, such as a central processing unit, and an input device. One skilled in the art will appreciate that this computer can contain additional or different components. Furthermore, although aspects of the present disclosure are described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM.

In addition to the pressure sensor 30, the controller 210 may also be connected to other components of the internal combustion engine 10 to control engine speed (e.g., revolutions per minute) or to stop the engine. In certain embodiments, the controller 210 may be configured to slow the engine speed or stop the engine if the pressure sensor 30 senses a pressure at or above a threshold value. The threshold value may be set to be a pressure in the combustion chamber that may indicate danger to one or more components of the engine.

In one or more embodiments, the pressure sensor adaptor 110 may be used to replace a component of an internal combustion engine with a pressure sensor 30. For example, the pressure sensor adaptor 110, may be used to replace a pressure relief valve with the pressure sensor 30. In these or other embodiments, a cylinder head that includes a pressure relief valve is provided. The cylinder head may optionally be attached to an engine block. The pressure relief valve is removed from the cylinder head to provide an empty channel in the cylinder head. The pressure sensor adaptor 110 and the pressure sensor 30 are installed into the empty channel in the cylinder head as a pressure sensor assembly. Alternatively, the pressure sensor adaptor 110 may be installed into the empty channel and then the pressure sensor 30 is installed in the pressure sensor channel 126. A cable 212 may be attached the pressure sensor 30 to connect it to a controller 210.

In one or more embodiments, the pressure sensor adaptor 110 may be included in a kit. In certain embodiments, the kit may be packaged in suitable packaging such as a box, a blister pack, or a bag. The kit may provide all or a portion of the components to add a pressure sensor assembly to an internal combustion engine (e.g., internal combustion engine 10). In these or other embodiments, the kit may include the pressure sensor adaptor 110 and the pressure sensor 30. Other additional optional components of the kit may include one or more of a cable 212, an annulus-shaped seal 32, a controller 210, a program stored in memory, and tools for installation of the pressure sensor adaptor 110 and/or the pressure sensor 30. In certain embodiments, the kit may include instructions for the installation of the pressure sensor adaptor 110 and pressure sensor 30. In one or more embodiments, the kit may provide instructions for removing a component of an internal combustion engine and replacing it with pressure sensor assembly.

It will be appreciated that any of the methods or functions described herein may be performed by or controlled by the controller. Further, any of the methods or functions described herein may be embodied in a computer-readable non-transitory medium for causing the controller to perform the methods or functions described herein. Such computer-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a hybrid powertrain, a machine, or combinations thereof, including other methods and functions not described herein.

INDUSTRIAL APPLICABILITY

The present disclosure is generally applicable to a pressure sensor adaptor and pressure sensor assembly that includes a pressure sensor adaptor and a pressure sensor, and a kit that includes a pressure sensor adaptor and a pressure sensor. The pressure sensor adaptor and pressure sensor assembly and the kit may be used to add a pressure sensor in an internal combustion engine not previously equipped with a pressure sensor or replace a broken or faulty pressure sensor in an internal combustion engine. As indicated above, the pressure sensor assembly may be used to replace a component of an internal combustion engine, for example a pressure relief valve, with a pressure sensor. Therefore, in the exemplary embodiment, the pressure sensor adaptor is configured to be installed into and to utilize a pre-existing passage in the cylinder head that has access to the combustion chamber (i.e., the passage into which the pressure relief valve was positioned). Thus, due to the use of the pressure sensor adaptor, the pressure sensor may be added to an internal combustion engine without the need for machining of the cylinder head or engine block.

It will be appreciated that the foregoing description provides examples of the disclosed system and technique. However, it is contemplated that other implementations of the disclosure may differ in detail from the foregoing examples. All references to the disclosure or examples thereof, are intended to reference the particular examples being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

ELEMENT LIST

Element Number Element Name

10 internal combustion engine
12 cylinder head
14 engine block
16 cylinder
18 piston
20 combustion chamber
22 at least one valve
24 cylinder head channel
26 access channel
28 access channel opening
30 pressure sensor
32 annulus-shaped seal
70 longitudinal axis
110 pressure sensor adaptor
112 cylindrical midsection
114 threaded section
116 annular section
118 first tier
120 second tier
122 tapered section
124 tool interface
126 pressure sensor channel
127 first opening
128 first end 129 second opening
130 opposing second end
132 faces
134 threaded section lip
136 annular section lip
138 tiered section
150 first cylindrical section
152 first truncated cone section
154 second cylindrical section
156 second truncated cone section
158 third cylindrical section
160 fourth cylindrical section
162 lip section
200 pressure sensor measuring system
210 controller
212 cable

What is claimed is:

1. An internal combustion engine comprising:
a combustion chamber defined by a space between a cylinder in an engine block, a cylinder head, and a piston, an internal surface of the cylinder head defining a cylinder head channel and a non-linear access channel, the cylinder head channel being in fluid communication with the combustion chamber via the non-linear access channel;
a pressure sensor adaptor disposed in the cylinder head channel, the pressure sensor adaptor comprising:
a first end,
a second end disposed closer to the non-linear access channel than the first end,
a threaded section disposed between the first end and the second end, the threaded section including screw threads disposed on an outer surface of the pressure sensor adaptor,
a cylindrical midsection disposed between the threaded section and the second end, and
an annular section disposed between the cylindrical midsection and the second end,
an internal surface of the pressure sensor adapter defining a pressure sensor channel that comprises an opening in the first end and an opening in the second end, and that spans from the first end to the second end through the threaded section, the cylindrical midsection, and the annular section; and
a pressure sensor disposed in the pressure sensor channel of the pressure sensor adaptor, the pressure sensor being in fluid communication with the combustion chamber via the opening in the second end.

2. The internal combustion engine of claim 1, wherein the pressure sensor is selected from the group consisting of piezoelectric type pressure sensors, strain gauge type pressure sensors, electromagnetic type pressure sensors, and optical type pressure sensors.

3. The internal combustion engine of claim 1, wherein the pressure sensor channel comprises a series of cylindrical sections or conical sections that decrease in diameter when traversing from the first end to the second end.

4. The internal combustion engine of claim 1, further comprising a controller connected to the pressure sensor via a cable.

5. The internal combustion engine of claim 4, wherein the controller is configured to decrease a speed of the internal combustion engine or stop the internal combustion engine in response to the pressure sensor sensing a pressure at or above a threshold value.

6. The internal combustion engine of claim 1, further comprising a plurality of combustion chambers including the combustion chamber, a plurality of pressure sensor adaptors including the pressure sensor adapter, and a plurality of pressure sensors including the pressure sensor,
each combustion chamber of the plurality of combustion chambers being in fluid communication with a pressure sensor adapter of the plurality of pressure sensor adapters,
each pressure sensor of the plurality of pressure sensors being disposed in a corresponding pressure sensor adapter of the plurality of pressure sensor adapters.

7. A kit comprising:
a pressure sensor;
a pressure sensor adaptor comprising:
a first end,
a second end disposed opposite the first end,
a threaded section disposed between the first end and the second end, the threaded section including screw threads disposed on an outer surface of the pressure sensor adaptor,
a cylindrical midsection disposed between the threaded section and the second end, and
an annular section disposed between the cylindrical midsection and the second end,
an internal surface of the pressure sensor adapter defining a pressure sensor channel that comprises an opening in the first end and an opening in the second end and that spans from the first end to the second end through the threaded section, the cylindrical midsection, and the annular section;
the first end being configured to receive the pressure sensor,
the second end being configured to effect fluid communication between a combustion chamber and the pressure sensor disposed at the first end.

8. The kit of claim 7, further comprising one or more components selected from the group consisting of a cable, an annulus-shaped seal, a controller, a program stored in memory, tools for installation of the pressure sensor adaptor, and tools for installation of the pressure sensor.

9. The kit of claim 7, further comprising instructions for removing a component of an internal combustion engine and replacing it with the pressure sensor adaptor and the pressure sensor.

10. The kit of claim 7, wherein the pressure sensor is selected from the group consisting of piezoelectric type pressure sensors, strain gauge type pressure sensors, electromagnetic type pressure sensors, and optical type pressure sensors.

11. The kit of claim 7, wherein the pressure sensor channel comprises a series of cylindrical sections or conical sections that decrease in diameter when traversing from the first end to the second end.

12. A method for installing a pressure sensor, the method comprising:
providing an internal combustion engine that includes
a combustion chamber defined by a space between a cylinder in an engine block, a cylinder head, and a piston, and
a cylinder head channel in the cylinder head that provides access to the combustion chamber;
installing a pressure sensor adaptor in the cylinder head channel, the pressure sensor adaptor comprising:
a first end,
a second end disposed closer to the combustion chamber than the first end, a threaded section disposed between the first end and the second end, the threaded section including screw threads disposed on an outer surface of the pressure sensor adaptor, a cylindrical midsection disposed between the threaded section and the second end, and an annular section disposed between the cylindrical midsection and the second end, an internal surface of the pressure sensor adapter defining a pressure sensor channel that comprises an opening in the first end and an opening in the second end and that spans from the first end to the second end through threaded section, the cylindrical midsection, and the annular section; and installing the pressure sensor in the pressure sensor channel by inserting the pressure sensor through the opening in the first end, the pressure sensor being in fluid communication with the combustion chamber via the opening in the second end.

13. The method of claim 12, further comprising removing a component of the internal combustion engine from the cylinder head channel prior to the step of installing the pressure sensor adaptor.

14. The method of claim 13, wherein the internal combustion engine is a spark ignition engine or a compression ignition engine.

15. The method of claim 13, wherein the pressure sensor is selected from the group consisting of piezoelectric type pressure sensors, strain gauge type pressure sensors, electromagnetic type pressure sensors, and optical type pressure sensors.

16. The method of claim 13, wherein the pressure sensor channel comprises a series of cylindrical sections or conical sections that decrease in diameter when traversing from the first end to the second end.

17. The method of claim 13, further comprising connecting a controller to the pressure sensor.

18. The internal combustion engine of claim 1, wherein an outer diameter of the annular section is greater than an outer diameter of the cylindrical midsection.

19. The kit of claim 7, wherein an outer diameter of the annular section is greater than an outer diameter of the cylindrical midsection.

20. The method claim 12, wherein an outer diameter of the annular section is greater than an outer diameter of the cylindrical midsection.

* * * * *